United States Patent [19]

Malmasson

[11] Patent Number: 5,748,689

[45] Date of Patent: May 5, 1998

[54] SEALING DEVICE FOR AN INSTRUMENTATION COLUMN PENETRATING THE HEAD OF THE VESSEL OF A NUCLEAR REACTOR INSIDE AN ADAPTER

[75] Inventor: Jacques Malmasson, Evry, France

[73] Assignees: Framatome, Courbevoie; ATEA Société Atlantique de Techniques Avancées, Carquefou, both of France

[21] Appl. No.: 526,250

[22] Filed: Sep. 11, 1995

[30] Foreign Application Priority Data

Sep. 9, 1994 [FR] France ................... 94 10815

[51] Int. Cl.$^6$ ................ G21C 13/02; G21C 17/00
[52] U.S. Cl. ........................... 376/204; 376/245
[58] Field of Search ..................... 376/203, 204, 376/245, 247, 254

[56] References Cited

U.S. PATENT DOCUMENTS

| | | | |
|---|---|---|---|
| 3,844,883 | 10/1974 | Bevilacqua et al. | 376/205 |
| 4,402,773 | 9/1983 | Morrill | 285/25 |
| 4,515,750 | 5/1985 | Pardini et al. | 376/203 |
| 4,653,172 | 3/1987 | Hackley | 376/203 |
| 4,655,483 | 4/1987 | Margotta | 376/204 |
| 4,807,262 | 2/1989 | Shields | 376/203 |
| 4,812,285 | 3/1989 | Stapleton | 376/203 |
| 5,084,228 | 1/1992 | Lhwillier | 326/203 |
| 5,406,596 | 4/1995 | Malmasson | 376/203 |
| 5,513,227 | 4/1996 | Margotta | 376/203 |

FOREIGN PATENT DOCUMENTS

| | | |
|---|---|---|
| 0 244 669 | 11/1987 | European Pat. Off. . |
| 0 288 745 | 11/1988 | European Pat. Off. . |
| 2 642 217 | 7/1990 | France . |
| 2 676 524 | 11/1992 | France . |
| 2 098 689 | 11/1982 | United Kingdom . |

Primary Examiner—Harvey E. Behrend
Attorney, Agent, or Firm—Pollock, Vande Sande & Priddy

[57] ABSTRACT

The instrumentation column (5) comes to bear via a bearing surface and a sealing gasket (16) inside a bearing element including a tubular length (8) and a closure cover (11) joined together by screwed assembly means. The tubular length (8) and the cover (11) each include a bearing surface (33a, 34) which is symmetrical of revolution about the axis of the instrumentation column (5). The bearing surface (33a) of the cover (11) and the bearing surface (34) of the tubular length (8) between them, through direct metal-to-metal contact, provide sealing against the pressurized water of the reactor.

4 Claims, 4 Drawing Sheets

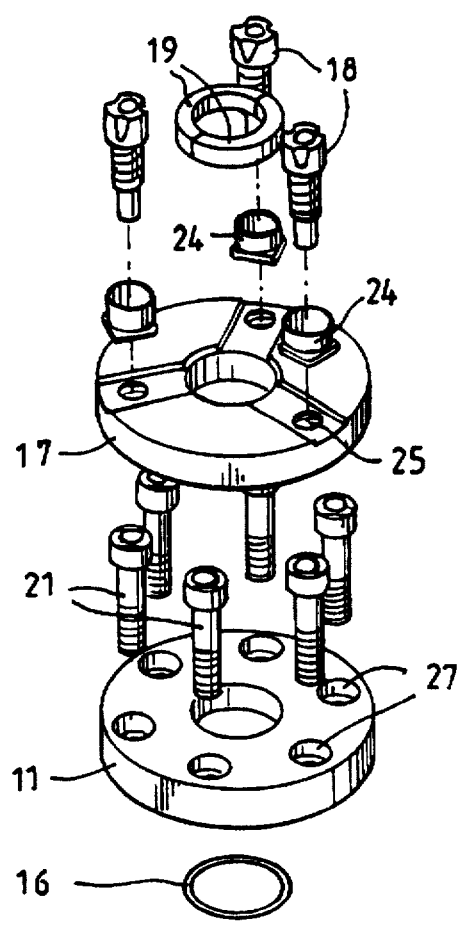
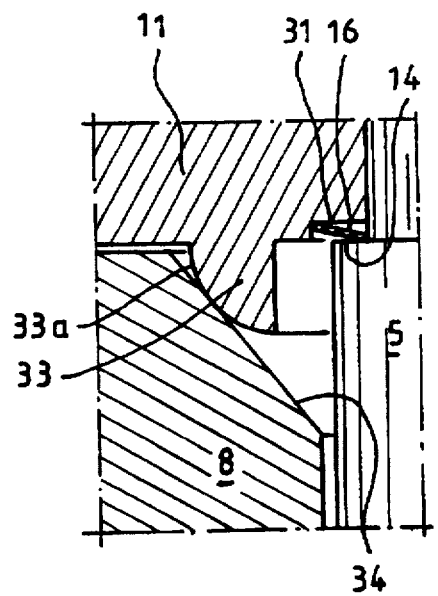
FIG.4
FIG.2

SEALING DEVICE FOR AN INSTRUMENTATION COLUMN PENETRATING THE HEAD OF THE VESSEL OF A NUCLEAR REACTOR INSIDE AN ADAPTER

FIELD OF THE INVENTION

The invention relates to a sealing device for an instrumentation column penetrating the head of the vessel of a nuclear reactor inside an adapter.

The invention may apply in particular to the sealed passage of thermocouple columns through the head of the vessel of a nuclear reactor.

BACKGROUND OF THE INVENTION

In pressurized-water nuclear reactors, the vessel containing the core of the reactor includes a substantially hemispherical head having openings in which are fixed adapters allowing the passage of the control rods of the reactor and instrumentation columns such as a set of thermocouples is arranged in each of the thermocouple columns making it possible to measure the temperature of the coolant fluid at the outlet of a set of fuel assemblies of the core of the reactor.

Each one of the adapters includes a part projecting under the head providing guidance for the thermocouple column and a part projecting above the head including means for connecting a tubular bearing assembly of the thermocouple column, which assembly can be fixed in the extension of the adapter.

Inside the bearing assembly fixed to the adapter are arranged sealed bearing means intended to interact with a surface of the thermocouple column in order to provide the sealed passage of the thermocouple column through the bore in the bearing assembly extending the adapter in the axial direction.

The thermocouple column which passes through the bore in the bearing assembly and the bore in the adapter which are situated in the axial extension of one another includes an end which projects relative to the bearing assembly which is in engagement with a lifting device which works by pulling, allowing the thermocouple column to be moved in the axial direction. The bearing surface of the thermocouple column and the sealed bearing means of the bearing assembly can thus be brought into contact, with a certain pressure.

The sealed bearing means of the thermocouple column inside the bearing assembly generally consist of a frustoconical bearing surface machined into the internal bore of the bearing assembly and the shape of which complements the shape of the bearing surface of the thermocouple column, and of a gasket which is compressed between the bearing surfaces of the thermocouple column and of the bearing assembly when clamping is performed by pulling on the upper end of the thermocouple column.

When the sealing device of the instrumentation column has been in use for some time in the reactor in service, it may be necessary to extract the thermocouple column from the adapter or to extract the sealing gasket interposed between the bearing surface of the thermocouple column and the bearing assembly, and to replace it with a new gasket when the sealing gasket has become defective.

To make it easier to perform these operations, it has been proposed to make the bearing assembly in several parts.

For example, FR-A-2,642,217 and FR-A-94-03855 propose and describe a bearing assembly which includes a tubular length secured to the outer end of the adapter and a flange of annular shape forming a cover attached to the tubular length and means for assembling the tubular length and the cover. The gasket or set of sealing gaskets of the thermocouple column comes to bear against the internal face of the cover of the bearing assembly fixed to the tubular length.

The tubular length may be attached and fixed to the outside end of the adapter by means of a connection flange or else may be welded to the end part of the adapter. The tubular length may equally well consist of the upper part of the adapter machined so as to receive the means for assembling the cover of the bearing assembly.

The assembly means may be produced in the form of screws coming into engagement with fastening pieces engaged in cavities machined in the tubular length and emerging on the lateral surface of the length. In this way, the bearing assembly may be dismantled even in the event of the assembly screws having seized up.

In known devices of the prior art, sealing is produced, between the tubular length and the cover of the bearing assembly, around their central bore through which the instrumentation column passes, by means of a metal gasket fitted between, and clamped by, the means for assembly between the cover and the tubular length.

Owing to the very high pressure of the primary fluid of the reactor (155 bar), it is necessary to exert an extremely high pressure on the metal gasket by means of the means for assembling the cover and the tubular length of the bearing assembly.

The sealing gasket is liable to deform excessively under the effect of the pressure during the use of the nuclear reactor. This deformation may result in a loss of sealing of the connection between the elements of the bearing assembly.

Furthermore, the means for assembling the cover and the tubular length of the bearing assembly, which generally include three screws which are distributed at 120° about the axis of the instrumentation column and which are each engaged in a fastening piece of the tubular length, do not always allow the cover to be tightened down onto the tubular length with sufficient pressure.

The devices-according to the prior art therefore do not allow perfect sealing always to be provided around the instrumentation column.

SUMMARY OF THE INVENTION

The object of the invention is a sealing device for an instrumentation column penetrating the head of a pressurized-water nuclear reactor vessel, inside an adapter of tubular shape fixed into a penetration opening of the head and projecting outside the vessel head, including a tubular bearing assembly fixed to the end of the adapter outside the head and in its axial extension and comprising a tubular length integral with the outside end of the adapter, an annular cover attached to the tubular length and means for assembling the cover and the tubular length, and at least one annular sealing gasket arranged between a bearing surface of the instrumentation column and an internal part of the cover of the tubular bearing assembly, this sealing device having great effectiveness and making it possible to avoid any risk of leakage between the cover and the tubular element of the bearing assembly.

To this end, the tubular length and the cover of the bearing assembly each include a bearing surface which is symmetrical of revolution about the axis of the adapter so that the bearing surface of the cover and the bearing surface of the tubular length between them, through direct metal-to-metal contact, provide sealing against the pressurized water of the reactor when they are fixed on one another by the assembly means.

Preferably, the means for assembling the cover onto the tubular length consist of at least three clamping screws and, for example, six screws and two fastening pieces in the form of half-rings engaged in a groove on the external lateral surface of the tubular length and each of which has three tapped openings for clamping the cover down onto the tubular length.

Also in a preferred manner, the annular sealing gasket arranged between the bearing surface of the instrumentation column and the internal part of the cover of the tubular bearing assembly consists of an annular deformable frustoconical metal gasket coming to bear via its small base on the thermocouple column and, via its large base, on the internal surface of the cover of the bearing assembly.

BRIEF DESCRIPTION OF THE DRAWINGS

In order that the invention may be more easily understand, there will now be described, by way of example, with reference to the appended drawings, one embodiment of a sealing device according to the invention making it possible to provide the sealing of a thermocouple column penetrating the head of the vessel of a nuclear reactor inside an adapter.

FIG. 2 is an exploded perspective view of the elements making up the sealing device.

FIG. 3A represents the sealing device in the clamped and sealed position.

FIG. 3B represents the device in the slackened-off position.

FIG. 4 is an enlarged view of the detail 4 in FIG. 3A.

DESCRIPTION OF PREFERRED EMBODIMENT

Figure 1:
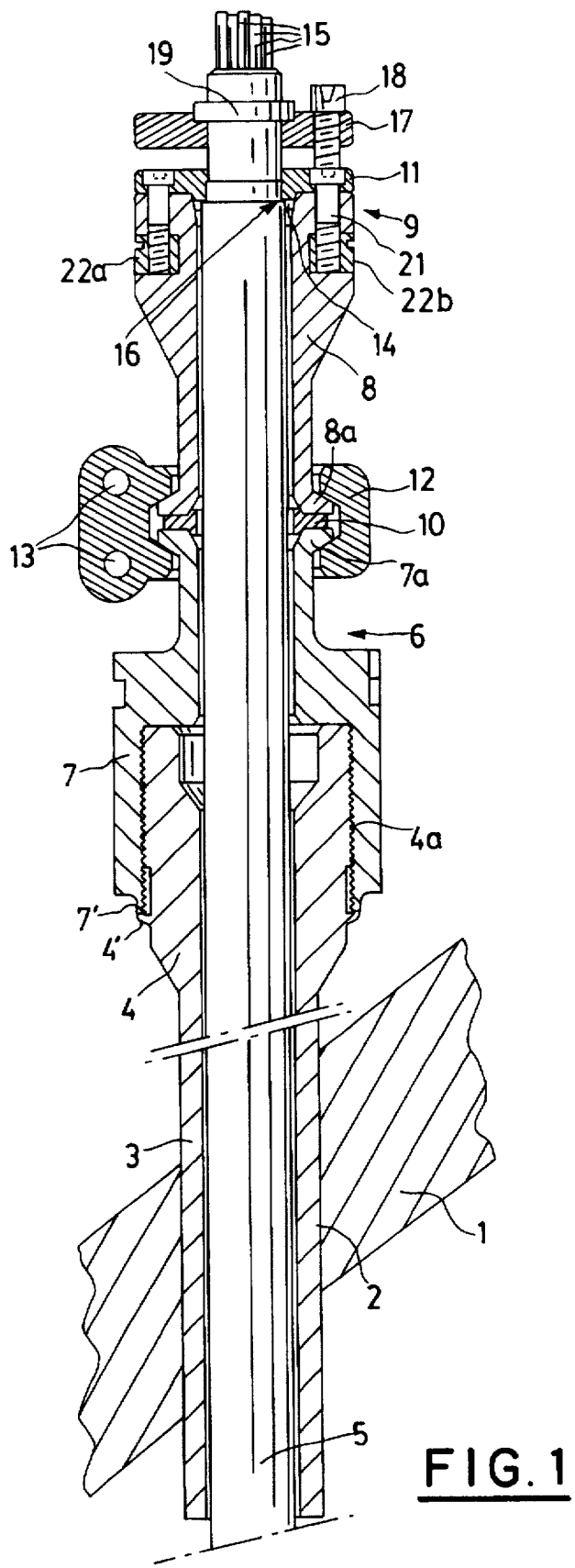
FIG. 1 is a view in section through a vertical plane of a penetration through the head of the vessel of a nuclear reactor providing the passage of a thermocouple column and equipped with a sealing device according to the invention.

FIG. 1 shows part of the vessel head 1 of a pressurized-water nuclear reactor penetrated by an opening 2 in which is fixed, in a sealed manner, by crimping and welding, an adapter 3 including a part projecting below the head of the vessel providing guidance for a thermocouple column 5 and a flared part 4 projecting above the head 1 of the vessel, and on the external surface of which a screw thread 4a is machined.

In the upper part 4 of the adapter 3 there is fixed, in the axial extension of the adapter 3, an assembly 6 for fixing and sealing the thermocouple column 5, by means of a lower part 7 including a tapped bore which is engaged over the screw-threaded part 4a of the flared part 4 of the adapter 3. The assembly 6 for fixing and sealing the thermocouple column 5 is thus assembled at the end of the adapter 3. The flared part 4 of the adapter 3 and the lower part 7 of the fixing and sealing assembly 6 include circular gaskets 4' and 7' which come into coincidence when the extension piece 7 is screwed home onto the flared part 4. The gaskets 4' and 7' are joined by welding so as to provide sealing of the screwed connection between the components 4 and 7.

The head and the penetration adapters 3 are made at the factory and transported to the site where the nuclear reactor is being installed.

The devices 6 for fixing and sealing the thermocouple columns 5 are attached and fixed to the upper ends of the adapters at the reactor site.

The lower part of the fixing and sealing assembly 6 is fixed to the end of the adapter so that it can be dismounted if need be by melting the zone where the gaskets 4' and 7' are joined. This dismounting is undertaken only for repair or exceptional interventions on the penetration piece of the thermocouple column.

The fixing and sealing assembly 6 includes an upper part 8 which is assembled in a sealed manner to the extension piece 7 with interposition of a specially shaped metal gasket 10, the parts 7 and 8 of the fixing and sealing assembly being assembled by virtue of a clamping flange 12 comprising two parts which may be joined together and clamped by virtue of screws inserted into the openings 13 passing through opposite lugs situated at the end of the two parts in the form of sectors.

The clamping flange includes, at its internal part, frustoconical bearing surfaces which come into clamping contact with corresponding frustoconical bearing surfaces machined on flared end parts 7a and 8a of the extension piece and of the upper part 8, respectively, of the fixing and sealing assembly 6.

The adapter 3 and the fixing and sealing assembly 6 are tubular and are arranged in the axial extension of one another so as to form a passage for the thermocouple column 5 consisting of a support tube and a set of thermocouples 15.

The upper part 8 of the assembly for fixing the thermocouple column constitutes a tubular length of the bearing assembly 9 of the sealing device. The bearing assembly 9 of the thermocouple column includes, in addition to the tubular length 8, a flange 11 constituting an annular cover attached to the tubular length and fixed by screws 21 in a manner which will be described hereinbelow.

In the case of a bearing assembly such as the assembly 9 produced in two parts fixed to one another by screws, it is possible to fix the tubular length 8 onto the extension piece 7 or onto the upper part 4 of the adapter by welding, or even to produce the tubular length 8 in one piece with the upper part 4 of the adapter 3, which is machined to receive the means for assembling the cover 11.

In fact, the dismountable connection between the tubular length 8 and the adapter by means of the clamping flange 12 is then no longer indispensable for dismounting the thermocouple column 5 and its sealing gasket. This dismounting may be effected by separating the cover 11 from the tubular length 8 of the bearing assembly 9.

The tubular length 8 and the cover 11 of the bearing assembly 9 include bores which are arranged in the axial extension of one another and in the axial extension of the bore in the adapter 3.

The thermocouple column 5 includes an upper part whose diameter is less than the diameter of the standing part and which is separated from the standing part by a shoulder of substantially frustoconical shape constituting the surface 14 by which the thermocouple columns bears on the sealing gasket 16 bearing on the internal lower surface of the cover 11.

The movement of the thermocouple column 5 in order to tighten the bearing surface 14 down against the sealing-gasket 16 is provided by a compression plate 17 penetrated by tapped openings and equipped with compression screws 18 engaged in the tapped openings and coming to rest, via their lower end, on the heads of screws 21 for fixing the cover 11.

The plate 17 includes a central opening allowing it to be engaged over the end part of the instrumentation column 5.

A pull-ring 19 whose outside diameter is greater than the diameter of the central opening in the plate 17, which ring consists of two half-rings engaged in a groove formed at the peripheral part of the thermocouple column in its upper part, makes it possible to transmit the tensile load exerted by the plate 17 to the thermocouple column 5.

Reference will now be made to FIGS. 2, 3A, 3B and 4 in order to describe the sealing device according to the invention including, in particular, the bearing assembly 9, the sealed bearing means 16 of the thermocouple column 5 and the compression plate 17.

In FIG. 2, the various elements forming the sealing device before their assembly have been represented in an exploded perspective view.

The tubular element 8 and the cover 11 are designed to be joined together to form the bearing element 9. The tubular element 8 includes a peripheral groove 20 on its lateral surface laterally receiving two half-rings 22a and 22b constituting the pieces fastening the screwed means for assembling the cover 11 with the tubular element 8.

The upper part of the tubular element 8, above the groove 11, forms a flange which has six axial holes 26 passing through it, these holes being arranged at 60° from one another about the axis of the tubular element 8.

The cover 11 itself has six holes 27 arranged at 60° from one another about the axis of the cover 11 passing through it, so that the holes 26 and 27 may come into superposed positions when the cover 11 is put in place on the tubular element 8. Each of the half-rings 22a and 22b include three tapped holes 28 arranged so that when the half-rings 22a and 22b are engaged inside the groove 20, the holes 28 are arranged at 60° from one another about the axis of the tubular element 8 and may be placed in the extension of the holes 26.

The upper part of the tubular element 8 additionally has passing through it four holes 29 each arranged between two successive holes 26 and the half-rings 22a and 22b each include two holes 30 arranged between two successive holes 28 capable of coming into the extension of the holes 29 when the half-rings 22a and 22b are engaged in the groove 20 in a clearly defined orientation.

Positioning pins 23 may be engaged in the holes 29 and 30 in alignment with one another in order to hold the half-rings 22a and 22b in an orientation allowing the cover 11 to be fixed to the tubular element 8 by means of six screws 21. When the half-rings 22a and 22b are placed in an orientation allowing the positioning pins 23 to be engaged in the openings 29 and 30 in the extension of one another, the six tapped holes 28 are in the extension of the six holes 26 passing through the upper part of the tubular element 8 above the groove 20.

It then suffices, in order to fit the cover 11, to superpose the six holes 27 with the six holes 26 of the tubular element 8 in order to allow the screws 21 to be engaged in the aligned holes 27 and 26 and screw them into the tapped holes 28 in the half-rings 22a and 22b. The two parts of the bearing assembly 9 are thus assembled.

It is possible to use less than six screws 21 in order to assemble the cover 11 and the tubular element 8. However, at least three screws must be used. In the case where assembly is achieved using just three screws, six holes 26, 27, may, however, be provided on the pieces 11 and 8, and six tapped holes on the half-rings 22a and 22b. The screws 21 are engaged in one set out of two of the aligned holes. In the event a tapped hole becomes damaged, a set of adjacent holes may be used instead.

Figure 3A:
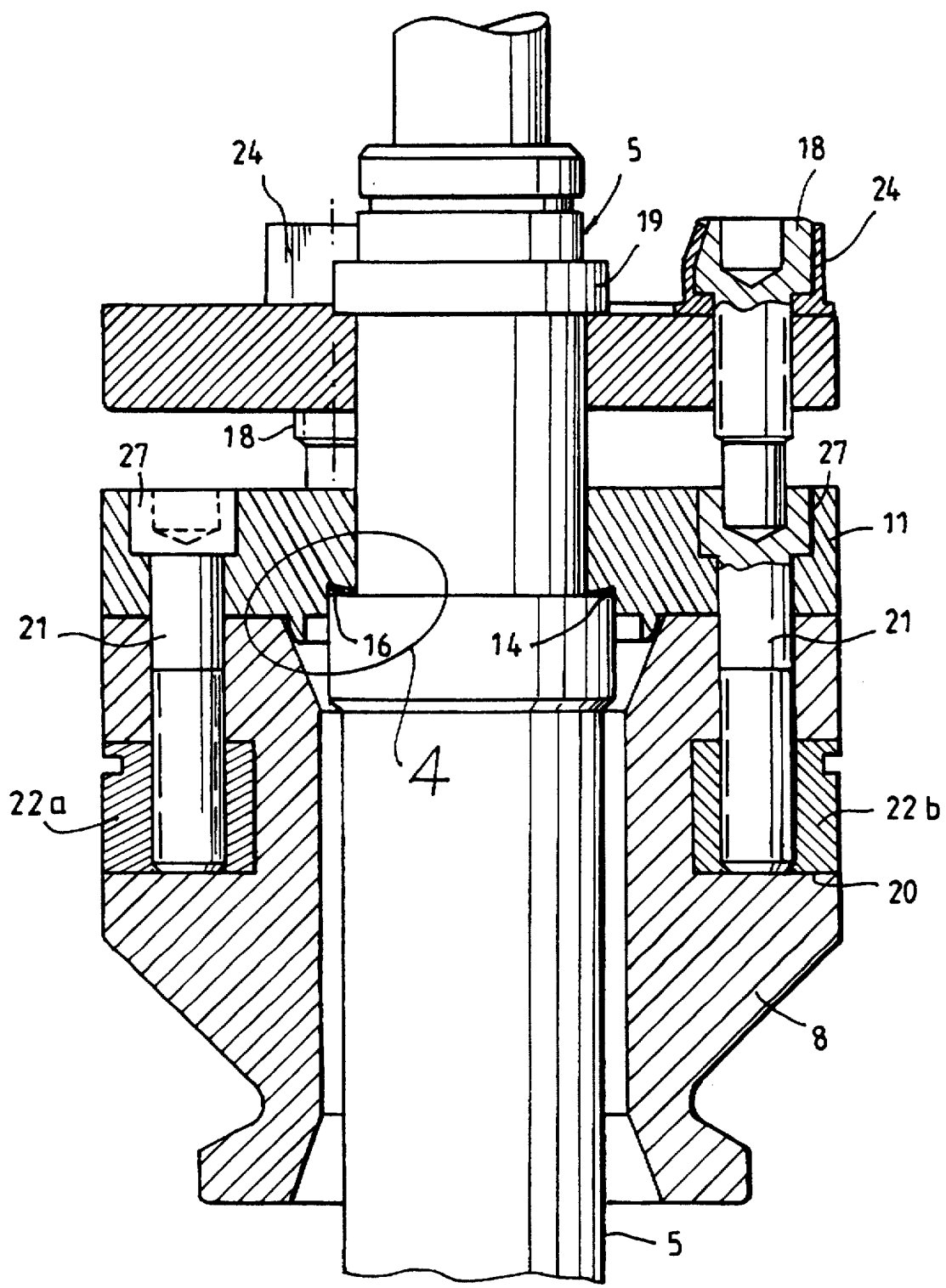
FIGS. 3A and 3B are views of the sealing device in section through an axial plane.
Figure 3B:
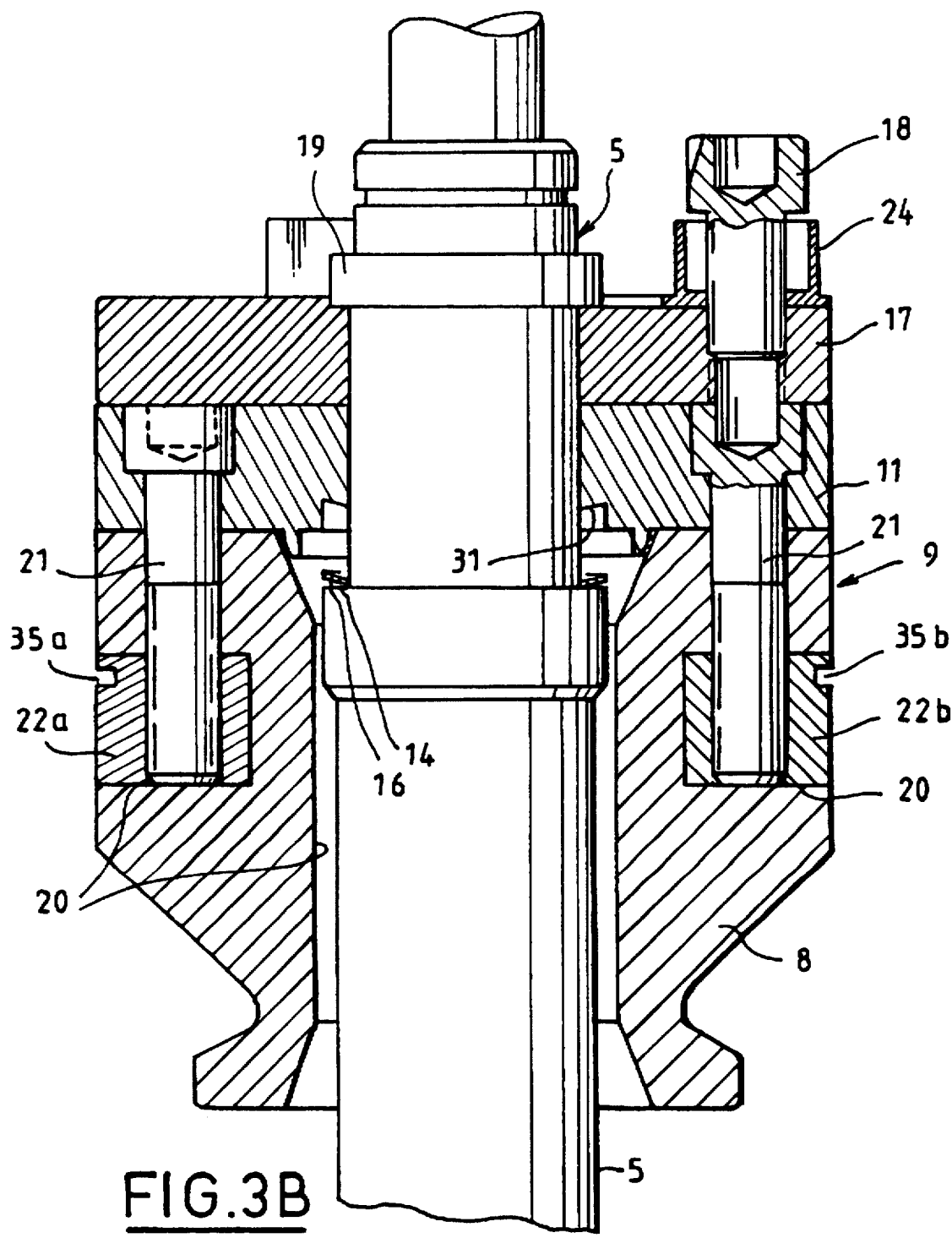

The screws 21 include a head which comes to bear in a diametrally widened upper part of the holes 27, in order to clamp the cover 11 down onto the tubular element 8, as can be seen particularly in FIGS. 3A and 3B.

When fitting the cover 11, the central opening in the cover 11 engages over the upper part of the thermocouple column 5 having a smaller diameter.

The two-part bearing ring 19 and the plate 17 are not yet engaged over the upper part of the thermocouple column 5 so that the plate 11 can be engaged over the upper part of this column.

As can be seen particularly in FIG. 3B, the lower surface or internal surface of plate 11 includes a groove whose axis is coaxial with the central passage opening of the thermocouple column 5, the bottom 31 of which constitutes a bearing surface for the external edge of the gasket 16 of the thermocouple column 5 whose internal edge comes to bear on the bearing surface 14 of the thermocouple column 5, as is visible particularly in FIG. 4.

FIG. 4 also shows that the plate 11 includes, around the central passage opening for the thermocouple column 5 and around the groove 31, in an arrangement which is coaxial relative to the central passage opening of the thermocouple column, an annular part 33 which projects relative to the lower face of the cover 11. The projecting annular part 33 of the cover 11 has an external surface 33a having the form of a spherical or toric sector.

The tubular length 8 to which the cover 11 is attached includes, at the upper end of its internal bore which provides the passage for the thermocouple column 5, a frustoconical surface 34 whose axis is the axis of the passage bore of the thermocouple column 5 aligned, in the fitted position of the cover 11, with the central opening via which the thermocouple column 5 passes through the cover 11.

When the cover 11 is fitted to the tubular element 8, the surface 33a in the form of a spherical sector of the cover 11 comes to bear on the frustoconical surface 34a of the tubular element 8.

When the screws 21 for assembling the cover 11 and the tubular element 8 are tightened, there is a slight sliding of the bearing surface 33a of the cover 11 over the corresponding bearing surface 34 of the tubular element 8.

The cover 11 is tightened down onto the tubular element 8 by torquing-up the six screws 21 which produce uniform clamping of the cover 11 onto the tubular element 8, via their bearing surfaces 33a and 34. The spherical shape of the bearing surface 33a makes it possible, in all cases, to achieve excellent contact between the surfaces 33a and 34. Thus sealing is produced between the elements 8 and 11 of the bearing assembly, around the thermocouple column 5, through direct metal-to-metal contact of the projecting element 33 of the cover 11 with the frustoconical bearing surface 34 of the tubular element 8.

Furthermore, in the position in which the gasket 16 of the thermocouple column is clamped down, as represented in FIG. 4, sealing is provided between the thermocouple column 5 and the cover 11.

The gasket 16 is a metal gasket in the form of a flexible annular wall of substantially frustoconical shape resting via its small base on the bearing surface 14 of the thermocouple column 5 and via its outer edge constituting its large base on the edge of the groove 31 in the cover 11.

As can be seen in FIGS. 3A and 3B, the half-rings 22a and 22b constituting nuts into which the screws 21 are fixed, each include a groove 35a or 35b on their outer surfaces constituting a recess for engagement of a means for cutting the half-rings 22a and 22b and the ends of the screws 21 in the event of the screws 21 seizing up.

Thus in all cases the bearing assembly 9 can be dismounted for example in order to gain access to the sealing gasket 16 or to extract the thermocouple column 5 from the adapter.

As can be seen in FIG. 3B, after sealed assembly and clamping of the cover 11 onto the tubular length 8, in order to constitute the bearing assembly 9, the compression plate 17 is engaged over the upper part of the thermocouple column 5.

The compression plate 17 includes three compression screws 18 which are engaged in three tapped openings passing through the plate 17 and arranged at 120° from one another about the axis of the plate 17 in the bottom of a counterbore 25 machined on the upper surface of the plate 17. Each of the screws 18 is engaged in a cup 24 with a square base which is engaged in the counterbore 25, so that the cup is rotationally blocked and a deformable shell.

The lower part of each of the screws 18 is engaged under the compression plate 17, into the profiled opening in a head of a screw 21 for the purpose of screw 21.

The two-part lifting ring 19 is fitted inside the groove in the thermocouple column 5, above the upper surface of the plate 17.

By rotating the screws 18 of the lifting plate 17 in the desired direction, possibly in synchronism for the three screws by use of a suitable tool, the plate 17 is lifted and, via the lifting ring 19, the thermocouple column 5 is lifted with its bearing surface 14, on which the sealing gasket 16 rests, moving toward the bottom of the groove 31.

After having moved the thermocouple column 5 upwards in the vertical direction, the gasket 16 is clamped down between the bearing surface 14 and the bottom of the groove 31 of the cover 11, as represented in FIG. 3A.

The sealing device according to the invention makes it possible to achieve very good sealing between the two components of the bearing element 9, through interaction of two metal bearing surfaces machined on the lower surface of the cover and on the internal surface of the tubular length, respectively. Very effective clamping is obtained owing to the use of six screws distributed around the periphery of the cover 11, three of which are screwed into a first half-ring into a second half-ring, these half-rings both being engaged in juxtaposed positions in a groove machined at the periphery of the tubular length.

As indicated earlier, it is, possible to achieve clamping with less than six screws, but at least three.

The bearing surfaces of the cover 11 and of the tubular length 8 can be used to achieve metal-to-metal sealing between these two components of a shape other than the spherical or toric shape and the frustoconical shape which have been described.

These bearing surfaces must in all cases have the shape of a surface of revolution about the axis of passage of the thermocouple column and allow a slight sliding and orientation of the two components of the bearing element relative to one another during tightening.

The sealing device according to the invention can apply not only to thermocouple columns but also to any instrumentation column penetrating the head of the vessel of a nuclear reactor inside an adapter.

I claim:

1. In a pressurized-water nuclear vessel having a head, a plurality of tubular adapters, each fixed into a penetration opening traversing said head and projecting outside the head, and at least one instrumentation column passing through one adapter of said plurality of adapters, a sealing device of said instrumentation column into said one adapter comprising:

(a) a tubular bearing assembly fixed to an end of said adapter outside the head, in an axial extension of said adapter, and comprising a tubular section integral with the end of the adapter, a cover of annular shape attached to the tubular section and means for assembling the cover and the tubular section; and (b) at least one annular sealing gasket arranged between a bearing surface of the instrumentation column and an internal part of the cover of the tubular bearing assembly;

(c) said cover comprising a spherical or toroidal bearing surface machined on a part of the cover projecting relative to a face of the cover pointing towards the tubular section; and (d) the tubular section comprising an internal bore having a part situated at the end of the tubular section constituting a frustoconical bearing surface of the tubular section;

(e) said spherical bearing surface of said cover and said frustoconical bearing surface of said tubular section being symmetrical in revolution about an axis of the thermocouple column and providing sealing against the pressurized water of the reactor through direct metal-to-metal contact when said spherical and frustoconical surfaces are tightened on one another by the means for assembling the cover and the tubular section.

2. Sealing device according to claim 1, wherein the means for assembling the cover and the tubular section include at least six clamping screws arranged at 60° from one another around the axis of the thermocouple column.

3. Sealing device according to claim 2, wherein the means for assembling the cover and the tubular section include two half-rings engaged in juxtaposed position inside a groove whose axis is an axis of the tubular section, and which is machined into a lateral surface of the tubular section, each of the half-rings including three tapped holes for the engagement of three clamping screws.

4. Sealing device according to claim 1, wherein the annular sealing gasket arranged between the bearing surface of the instrumentation column and the internal part of the cover is a gasket consisting of a deformable annular metal wall of substantially frustoconical shape coming into contact via a small base of said metal wall with the bearing surface of the thermocouple column and, via a large base of said metal wall with the internal part of the cover.

* * * * *